United States Patent
Cui

(10) Patent No.: US 9,520,718 B2
(45) Date of Patent: Dec. 13, 2016

(54) UNINTERRUPTIBLE POWER SUPPLY CIRCUIT

(71) Applicant: Huawei Technologies Co., Ltd., Shenzhen (CN)

(72) Inventor: Zhaoxue Cui, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 289 days.

(21) Appl. No.: 14/533,439

(22) Filed: Nov. 5, 2014

(65) Prior Publication Data

US 2015/0054343 A1 Feb. 26, 2015

Related U.S. Application Data

(63) Continuation of application No. PCT/CN2014/070449, filed on Jan. 10, 2014.

(30) Foreign Application Priority Data

Jul. 5, 2013 (CN) .......................... 2013 1 0282409

(51) Int. Cl.
*H02J 3/00* (2006.01)
*H02J 7/00* (2006.01)
(Continued)

(52) U.S. Cl.
CPC ................. *H02J 3/005* (2013.01); *H02J 7/00* (2013.01); *H02J 9/062* (2013.01); *H02M 7/797* (2013.01);
(Continued)

(58) Field of Classification Search
CPC .............. H02J 3/005; H02J 9/062; H02J 7/00; H02J 7/02; H02M 7/797; H02M 7/487; H02M 2001/008; H02M 7/483; H02M 1/10; Y10T 307/625
(Continued)

(56) References Cited

U.S. PATENT DOCUMENTS

| 5,241,217 A | 8/1993 | Severinsky |
| 7,599,196 B2 * | 10/2009 | Alexander .......... H02M 3/1582 363/124 |

(Continued)

FOREIGN PATENT DOCUMENTS

| CN | 1421978 A | 6/2003 |
| CN | 101572429 A | 11/2009 |

(Continued)

OTHER PUBLICATIONS

Partial English Translation and Abstract of Chinese Patent Application No. CN1421978A, Jan. 27, 2015, 10 pages.
(Continued)

*Primary Examiner* — Jared Fureman
*Assistant Examiner* — Michael Warmflash
(74) *Attorney, Agent, or Firm* — Conley Rose, P.C.

(57) ABSTRACT

An uninterruptible power supply circuit is provided. The uninterruptible power supply circuit includes a bidirectional selector switch, a first-type bidirectional converter, a second-type bidirectional converter, an energy storage apparatus, and a filtering apparatus, and is alternatively connected to an alternating-current power supply and the energy storage apparatus by using the bidirectional selector switch; the first-type bidirectional converter is disposed between the bidirectional selector switch and the filtering apparatus, the second-type bidirectional converter is disposed between the filtering apparatus and a load, and both the first-type bidirectional converter and the second-type bidirectional converter have a function of rectifying or inverting. By using a bidirectional converter and a bidirectional selector switch, alternating-current commercial power, the energy storage apparatus, and a charger required by the energy storage apparatus can share the bidirectional converter; compared with an existing uninterruptible power supply circuit, no extra charger or high-power conversion circuit is required.

13 Claims, 9 Drawing Sheets

(51) Int. Cl.
| | |
|---|---|
| *H02J 9/06* | (2006.01) |
| *H02M 7/797* | (2006.01) |
| *H02M 1/10* | (2006.01) |
| *H02M 7/483* | (2007.01) |
| *H02J 7/02* | (2016.01) |
| *H02M 7/487* | (2007.01) |
| *H02M 1/00* | (2006.01) |

(52) U.S. Cl.
CPC . *H02J 7/02* (2013.01); *H02M 1/10* (2013.01); *H02M 7/483* (2013.01); *H02M 7/487* (2013.01); *H02M 2001/008* (2013.01); *Y10T 307/625* (2015.04)

(58) Field of Classification Search
USPC .......................................................... 307/66
See application file for complete search history.

(56) References Cited

U.S. PATENT DOCUMENTS

| | | | | |
|---|---|---|---|---|
| 8,146,714 B2* | 4/2012 | Blasko | ...................... | B66B 1/30 |
| | | | | 187/290 |
| 2008/0012426 A1 | 1/2008 | Lu et al. | | |
| 2008/0197706 A1 | 8/2008 | Nielsen | | |
| 2015/0270744 A1* | 9/2015 | Lacarnoy | ................ | H02J 9/061 |
| | | | | 307/66 |

FOREIGN PATENT DOCUMENTS

| | | | |
|---|---|---|---|
| CN | 101657946 | A | 2/2010 |
| CN | 102427266 | A | 4/2012 |
| CN | 102593945 | A | 7/2012 |
| CN | 202713163 | U | 1/2013 |
| CN | 103368231 | A | 10/2013 |
| EP | 1076403 | A2 | 2/2001 |
| EP | 1478076 | A1 | 11/2004 |
| JP | 20000358378 | A | 12/2000 |
| WO | 2008076095 | A2 | 6/2008 |

OTHER PUBLICATIONS

Partial English Translation and Abstract of Chinese Patent Application No. CN103368231A, Part 1, Nov. 25, 2014, 8 page.
Partial English Translation and Abstract of Chinese Patent Application No. CN103368231A, Part 2, Nov. 25, 2014, 3 page.
"Research and Design of Small Power Uninterruptible Power Supply," Science and Technology Innovation Herald, China Academic Journal Electronic Publishing House, No. 31, Jun. 30, 2011, pp. 103-104.
English Translation of "Research and Design of Small Power Uninterruptible Power Supply," Feb. 9, 2015, 1 page.
Fengjiang, W., et al., "Grid-power-controllable UPS powered by photovoltaic cell, grid and battery," retrieved from URL: http://en.cnki.com.cn/Article_en/CJFDTOTAL-DLZS201106004.htm, Jun. 2011, 2 pages.
Foreign Communication From a Counterpart Application, PCT Application No. PCT/CN2014/070449, English Translation of International Search Report dated Apr. 16, 2014, 2 pages.
Foreign Communication From a Counterpart Application, PCT Application No. PCT/CN2014/070449, Written Opinion dated Apr. 16, 2014, 4 pages.
Foreign Communication From a Counterpart Application, Chinese Application No. 201310282409.2, Chinese Office Action dated Oct. 27, 2014, 5 pages.
Su, G., et al., "A Novel Topology for Single Phase UPS Systems," Industry Applications Conferences, Thirty-Second IAS Annual Meeting, Conference Record of the 1997 IEEE, Oct. 5, 1997, pp. 1376-1382.
Foreign Communication From a Counterpart Application, European Application No. 14790477.5, Extended European Search Report dated Jun. 9, 2015, 8 pages.

* cited by examiner

UNINTERRUPTIBLE POWER SUPPLY CIRCUIT

CROSS-REFERENCE TO RELATED APPLICATIONS

This application is a continuation of International Application No. PCT/CN2014/070449, filed on Jan. 10, 2014, which claims priority to Chinese Patent Application No. 201310282409.2, filed on Jul. 5, 2013, both of which are hereby incorporated by reference in their entireties.

TECHNICAL FIELD

The present invention relates to the field of uninterruptible power supply (UPS) technologies, and in particular, to a UPS circuit.

BACKGROUND

Currently, a problem of electric power shortage is solved only in a minority of regions in China; a majority of regions and large cities still face a problem of shortage of electric power supply, and power supply quality still less can be guaranteed; commercial power cannot meet a requirement of an electronic device with a high requirement for power supply quality.

A UPS emerges as the times require, and a role of the UPS is to replace the commercial power to provide electric energy for a load when commercial power supply stops; the UPS is internally disposed with an energy storage apparatus, and when the commercial power is abnormal or interrupted, the UPS maintains power supply to the load with electric energy in the energy storage apparatus in an inverting conversion method, so that the load maintains normal operations.

Generally, the UPS includes the following several parts: a rectifier, an inverter, a charging circuit, a discharging circuit, and an energy storage apparatus; in an existing UPS circuit, the rectifier is also used as a discharging circuit of the energy storage apparatus, but a charging circuit is still required, which makes a circuit structure complicated; in another existing UPS circuit, the commercial power and the energy storage apparatus separately use two independent conversion circuits (a rectifier or an inverter), where a charging circuit and a discharging circuit of the energy storage apparatus share a high-power battery conversion circuit; such a type of UPS circuit needs the high-power battery conversion circuit, making a UPS circuit structure complicated, and the high-power battery conversion circuit is high in cost; in conclusion, a structure of the existing UPS circuit is complicated.

SUMMARY

To solve the foregoing technical problem, embodiments of the present invention provide a UPS circuit and a control method of the UPS circuit, so as to lower complexity of a circuit structure of a UPS circuit, and technical solutions are as follows.

According to a first aspect, this application provides a UPS circuit, including a bidirectional selector switch, a first-type bidirectional converter, a second-type bidirectional converter, an energy storage apparatus, a filtering apparatus, and a controller, where a first end of the bidirectional selector switch is connected to an alternating-current end of the first-type bidirectional converter, a second end is alternatively connected to an alternating-current power supply or the energy storage apparatus, and a control end is connected to a first output end of the controller; a direct-current end of the first-type bidirectional converter is connected to the filtering apparatus, a control end is connected to a second output apparatus set of the controller, and an operating status of the first-type bidirectional converter includes rectifying, inverting, boosting and bucking; a direct-current end of the second-type bidirectional converter is connected to the filtering apparatus, an alternating-current end is connected to a load, a control end is connected to a third output end set of the controller, and an operating status of the second-type bidirectional converter includes inverting and rectifying; and the controller is configured to, when the energy storage apparatus needs to be charged, generate a control signal for controlling the bidirectional selector switch to connect to the energy storage apparatus, generate a control signal for controlling the first-type bidirectional converter to keep in a bucking state, and generate a control signal for controlling the second-type bidirectional converter to keep in a rectifying state; and when the energy storage apparatus discharges, output the control signal for controlling the bidirectional selector switch to connect to the energy storage apparatus, generate a control signal for controlling the first-type bidirectional converter to keep in a boosting state, and generate a control signal for controlling the second-type bidirectional converter to keep in an inverting state.

In a first possible implementation manner of the first aspect, the bidirectional selector switch is a relay or a bidirectional thyristor.

With reference to the first possible implementation manner of the first aspect, in a second possible implementation manner of the first aspect, the bidirectional selector switch is a single-pole double-throw relay, a first movable end of the single-pole double-throw relay is connected to the alternating-current power supply, a second movable end is connected to the energy storage apparatus, a fixed end is connected to the alternating-current end of the first-type bidirectional converter, and two ends of a coil are connected to the controller.

With reference to the first possible implementation manner of the first aspect, in a third possible implementation manner of the first aspect, the bidirectional selector switch includes a first-type bidirectional selector switch and a second-type bidirectional selector switch, where a first end of the first-type bidirectional selector switch is connected to the alternating-current power supply, a second end is connected to the alternating-current end of the first-type bidirectional converter, and a control end is connected to the controller; and a first end of the second-type bidirectional selector switch is connected to the energy storage apparatus, a second end is connected to the alternating-current end of the first-type bidirectional converter, and a control end is connected to the controller.

With reference to the third possible implementation manner of the first aspect, in a fourth possible implementation manner of the first aspect, both the first-type bidirectional selector switch and the second-type bidirectional selector switch are single-throw relays, a first normally opened contact of the single-throw relay is the first end of the bidirectional selector switch, a second normally opened contact of the single-throw relay is the second end of the bidirectional selector switch, and as control ends of the bidirectional selector switch, two ends of a coil of the single-throw relay are connected to the controller.

With reference to the third possible implementation manner of the first aspect, in a fifth possible implementation manner of the first aspect, when both the first-type bidirectional selector switch and the second-type bidirectional selector switch are bidirectional thyristors, a first end of the bidirectional thyristor is the first end of the bidirectional selector switch, a second end of the bidirectional thyristor is the second end of the bidirectional selector switch, and a gate of the bidirectional thyristor is the control end of the bidirectional selector switch and is connected to the controller.

With reference to the third possible implementation manner of the first aspect, the fourth possible implementation manner of the first aspect or the fifth possible implementation manner of the first aspect, in a sixth possible implementation manner of the first aspect, when the alternating-current power supply is a three-phase alternating-current power supply, the first-type bidirectional selector switch includes a first bidirectional selector switch, a second bidirectional selector switch, and a third bidirectional selector switch; the second-type bidirectional selector switch includes a fourth bidirectional selector switch, a fifth bidirectional selector switch, and a sixth bidirectional selector switch; the first-type bidirectional converter includes a first bidirectional converter, a second bidirectional converter, and a third bidirectional converter; and the second-type bidirectional converter includes a fourth bidirectional converter, a fifth bidirectional converter, and a sixth bidirectional converter, where a first end of the first bidirectional selector switch is connected to an alternating-current end of the first bidirectional converter, a second end is connected to a phase A of the three-phase alternating-current power supply, and a control end is connected to the controller; a first end of the second bidirectional selector switch is connected to an alternating-current end of the second bidirectional converter, a second end is connected to a phase B of the three-phase alternating-current power supply, and a control end is connected to the controller; a first end of the third bidirectional selector switch is connected to an alternating-current end of the third bidirectional converter, a second end is connected to a phase C of the three-phase alternating-current power supply, and a control end is connected to the controller; a first end of the fourth bidirectional selector switch is connected to the alternating-current end of the first bidirectional converter, a second end is connected to the energy storage apparatus, and a control end is connected to the controller; a first end of the fifth bidirectional selector switch is connected to the alternating-current end of the second bidirectional converter, a second end is connected to the energy storage apparatus, and a control end is connected to the controller; a first end of the sixth bidirectional selector switch is connected to the alternating-current end of the third bidirectional converter, a second end is connected to the energy storage apparatus, and a control end is connected to the controller; direct-current ends of the first bidirectional converter, the second bidirectional converter, and the third bidirectional converter are all connected to the filtering apparatus; direct-current ends of the fourth bidirectional converter, the fifth bidirectional converter, and the sixth bidirectional converter are all connected to the filtering apparatus, and alternating-current ends are all connected to the load; and the controller is configured to separately control statuses of the bidirectional selector switch, the first-type bidirectional converter, and the second-type bidirectional converter that are connected to a phase-A alternating-current circuit, a phase-B alternating-current circuit, and a phase-C alternating-current circuit, so as to separately control operation modes of the phase-A alternating-current circuit, the phase-B alternating-current circuit, and the phase-C alternating-current circuit, where the operation modes include an alternating-current power supply mode, a mode in which an energy storage apparatus supplies power, and a mode in which an energy storage apparatus is charged.

In a seventh possible implementation manner of the first aspect, the first-type bidirectional converter is a half-bridge fully-controlled bidirectional converter, and the half-bridge fully-controlled bidirectional converter includes a first switching tube and a second switching tube, where a common end obtained by connecting a first end of the first switching tube and a second end of the second switching tube is used as the alternating-current end of the first-type bidirectional converter; both a second end of the first switching tube and a first end of the second switching tube are used as the direct-current end of the first-type bidirectional converter; and control ends of the first switching tube and the second switching tube are used as the control end of the first-type bidirectional converter.

In an eighth possible implementation manner of the first aspect, the first-type bidirectional converter is an I-type bidirectional converter, and the I-type three-level bidirectional converter includes a first switching tube, a second switching tube, a third switching tube, a fourth switching tube, a first diode, and a second diode, where a first end of the first switching tube is connected to a second end of the second switching tube, a first end of the second switching tube is connected to a second end of the third switching tube, a first end of the third switching tube is connected to a second end of the fourth switching tube, a second end of the first switching tube and a first end of the fourth switching tube are used as the direct-current end of the first-type bidirectional converter, a common end of the second switching tube and the third switching tube is used as the alternating-current end of the first-type bidirectional converter, and control ends of the first switching tube, the second switching tube, the third switching tube, and the fourth switching tube are all connected to the controller; and an anode of the first diode is connected to a cathode of the second diode and is connected to a neutral wire end of the filtering apparatus, and a cathode of the first diode is connected to a common end of the first switching tube and the second switching tube; and an anode of the second diode is connected to a common end of the third switching tube and the fourth switching tube.

In a ninth possible implementation manner of the first aspect, the first-type bidirectional converter is a T-type bidirectional converter, and the T-type bidirectional converter includes a first switching tube, a second switching tube, a third switching tube, and a fourth switching tube, where a first end of the first switching tube is connected to a second end of the second switching tube, a common end of the first switching tube and the second switching tube is used as the alternating-current end of the first-type bidirectional converter, and a second end of the first switching tube and a first end of the second switching tube are used as the direct-current end of the first-type bidirectional converter; a second end of the third switching tube is connected to a first end of the fourth switching tube, a first end of the third switching tube is connected to the common end of the first switching tube and the second switching tube, and a second end of the fourth switching tube is connected to a neutral wire end of the filtering apparatus; and control ends of the first switching tube, the second switching tube, the third switching tube, and the fourth switching tube are all connected to the controller.

With reference to the eighth possible implementation manner of the first aspect or the ninth possible implementation manner of the first aspect, in a tenth possible implementation manner of the first aspect, the first switching tube, the second switching tube, the third switching tube or the fourth switching tube is an insulated gate bipolar transistor or a metal-oxide-semiconductor field-effect transistor, where an emitter of the insulated gate bipolar transistor is a first end, a collector is a second end, and a gate is a control end; and a source of the metal-oxide-semiconductor field-effect transistor is a first end, a drain is a second end, and a gate is a control end.

With reference to any one of the first possible implementation manner of the first aspect to the fifth possible implementation manner of the first aspect and the seventh possible implementation manner of the first aspect to the ninth possible implementation manner of the first aspect, in an eleventh implementation manner of the first aspect, the filtering apparatus includes a first capacitor and a second capacitor, where a cathode of the first capacitor is connected to an anode of the second capacitor and connected to an alternating-current neutral wire end, and as two ends of the filtering apparatus, an anode of the first capacitor and a cathode of the second capacitor are connected to the first-type bidirectional converter and the second-type bidirectional converter.

The UPS circuit provided in the present invention includes the bidirectional selector switch, the first-type bidirectional converter, the second-type bidirectional converter, the energy storage apparatus, and the filtering apparatus, the first end of the bidirectional selector switch is connected to the alternating-current end of the first-type bidirectional converter, and the second end is alternatively connected to the alternating-current power supply or the energy storage apparatus, where the first-type bidirectional converter supports functions of rectifying, inverting, boosting, and bucking. When the energy storage apparatus needs to be charged, voltages at the two ends of the filtering apparatus are bucked by the first-type bidirectional converter and then the bucked voltages are provided for the energy storage apparatus; in this case, the first-type bidirectional converter acts as a charger of the energy storage apparatus; therefore, no extra charger or high-power battery conversion circuit needs to be disposed for the UPS circuit provided in this application, thereby simplifying a circuit structure of the UPS circuit.

DETAILED DESCRIPTION

The following clearly describes the technical solutions in the embodiments of the present invention with reference to the accompanying drawings in the embodiments of the present invention. The described embodiments are merely a part rather than all of the embodiments of the present invention. All other embodiments obtained by a person of ordinary skill in the art based on the embodiments of the present invention without creative efforts shall fall within the protection scope of the present invention.

Figure 1:
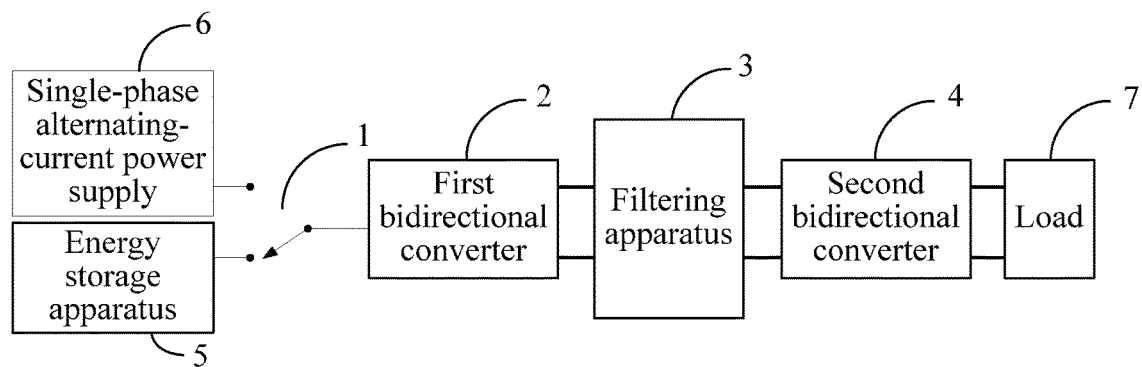
FIG. 1 is a schematic diagram of a circuit principle of a single-phase UPS circuit according to the present invention.

Referring to FIG. 1, FIG. 1 shows a block diagram of a principle of a single-phase UPS circuit according to this application.

The UPS circuit includes a bidirectional selector switch 1, a first bidirectional converter 2, a filtering apparatus 3, a second bidirectional converter 4, and an energy storage apparatus 5, where the bidirectional selector switch 1 may be implemented by using a single-pole double-throw relay, two relays, or two bidirectional thyristors.

One end of the bidirectional selector switch 1 is connected to an alternating-current end of the first bidirectional converter 2, and the other end is alternatively connected to an alternating-current power supply 6 or the energy storage apparatus 5. Specifically, a bidirectional selector switch shown in FIG. 1 is implemented by using a single-throw double-pole switch; a movable end is connected to the alternating-current end of the first bidirectional converter 2, a first fixed end is connected to the alternating-current power supply 6, a second fixed end is connected to the energy storage apparatus, and a control end is connected to a first output end of a controller; an action of the movable end is controlled by using a control signal output by the controller (not shown in the figure), thereby implementing that the alternating-current power supply 6 or the energy storage apparatus 5 is connected to the UPS circuit.

The alternating-current power supply may be a single-phase alternating-current power supply, a two-phase alternating-current power supply, or a three-phase alternating-current power supply, where the two-phase alternating-current power supply may be an independent two-phase alternating-current power supply, or may also be in a state that an alternating current in two phases in the three-phase alternating-current power supply supplies power and the other phase is abnormal.

A direct-current end of the first bidirectional converter 2 is connected to two ends of the filtering apparatus 3, a control end is connected to a second output end set of the controller, and an operating status of the first bidirectional converter is controlled by using a control signal output by the controller. Specifically, the first bidirectional converter has four operating statuses, which are rectifying, inverting, boosting, and bucking.

A direct-current end of the second bidirectional converter 4 is connected to two ends of the filtering apparatus 3, an alternating-current end is connected to a load 7, and a control end is connected to a third output end set of the controller; an operating status of the second bidirectional converter is controlled by using a control signal output by the controller; and the second bidirectional converter 4 has two operating statuses, which are rectifying and inverting.

The filtering apparatus 3 is implemented by using a capacitor, which is mainly used to filter out an interference signal, and further used for short-time energy storage; when the alternating-current power supply and the energy storage apparatus are switched, there is a transient interruption time during the switching; in this case, power is supplied to the load by using the filtering apparatus for a short time.

An operating process of the UPS circuit provided in this embodiment is as follows, when the alternating-current power supply normally supplies power, after an alternating current output by the alternating-current power supply is rectified by using the first bidirectional converter, direct-current voltages, that is, a +bus voltage and a −bus voltage, are generated at two ends of the filtering apparatus 3; after the +bus voltage and the −bus voltage are inverted by using the second bidirectional converter, an alternating current is obtained and provided for the load 7.

In a backflow process of an alternating current, when a load connected to the UPS circuit has an energy backfeed characteristic, the load is used as an energy source, an alternating current network side is the load, after energy at a load side is rectified by using the second bidirectional converter, the direct-current voltages, that is, the +bus voltage and the −bus voltage, are generated at the two ends of the filtering apparatus 3; after the +bus voltage and the −bus voltage are inverted by using the first bidirectional converter, the alternating current is obtained and provided for an alternating current network, thereby implementing that energy flows from the load side to the alternating current network side, and improving an energy utilization rate.

When the alternating-current power supply abnormally supplies power, the energy storage apparatus supplies power; after a direct current output by the energy storage apparatus is boosted by using the first bidirectional converter, the direct-current voltages, that is, the +bus voltage and the −bus voltage, are obtained at the two ends of the filtering apparatus 3; after the +bus voltage and the −bus voltage are inverted by using the second bidirectional converter, the alternating current is obtained and provided for the load 7.

When the energy storage apparatus is charged, buses +BUS and −BUS at two ends of the energy storage apparatus are used as energy sources, that is, the direct-current voltages, that is, the +bus voltage and the −bus voltage, are obtained at the two ends of the filtering apparatus 3; after the +bus voltage and the −bus voltage are bucked by using the first bidirectional converter 2, a battery is charged, and comparing charging power with that of an existing UPS circuit added with an extra charger circuit, the charging power is higher, and a charging capability matches with main power of the alternating-current power supply. Energy on the buses +BUS and −BUS may be provided by the alternating-current power supply by using the first bidirectional converter, or may further be obtained from the load by the second bidirectional converter; in this case, the load needs to have an energy backfeed characteristic, that is, the load can reversely supply the energy to the second bidirectional converter.

It should be noted that, a process of switching between different operating statuses of the first bidirectional converter and the second bidirectional converter is controlled by the control signal output by the controller; and an operating status of the bidirectional converter is finally changed by changing an operating status of switching tubes in the first bidirectional converter and the second bidirectional converter.

According to the single-phase UPS circuit provided in this embodiment, both the first bidirectional converter and the second bidirectional converter adopted have a function of allowing energy to flow in a bidirectional manner, and the alternating-current power supply and the energy storage apparatus are alternatively connected to a same bidirectional converter by using a bidirectional selector switch, so that the alternating-current power supply or the energy storage apparatus is connected to the bidirectional converter, implementing that the alternating-current power supply and the energy storage apparatus share one bidirectional converter, and no extra charger needs to be added, thereby simplifying a circuit structure of the UPS circuit.

Figure 2:
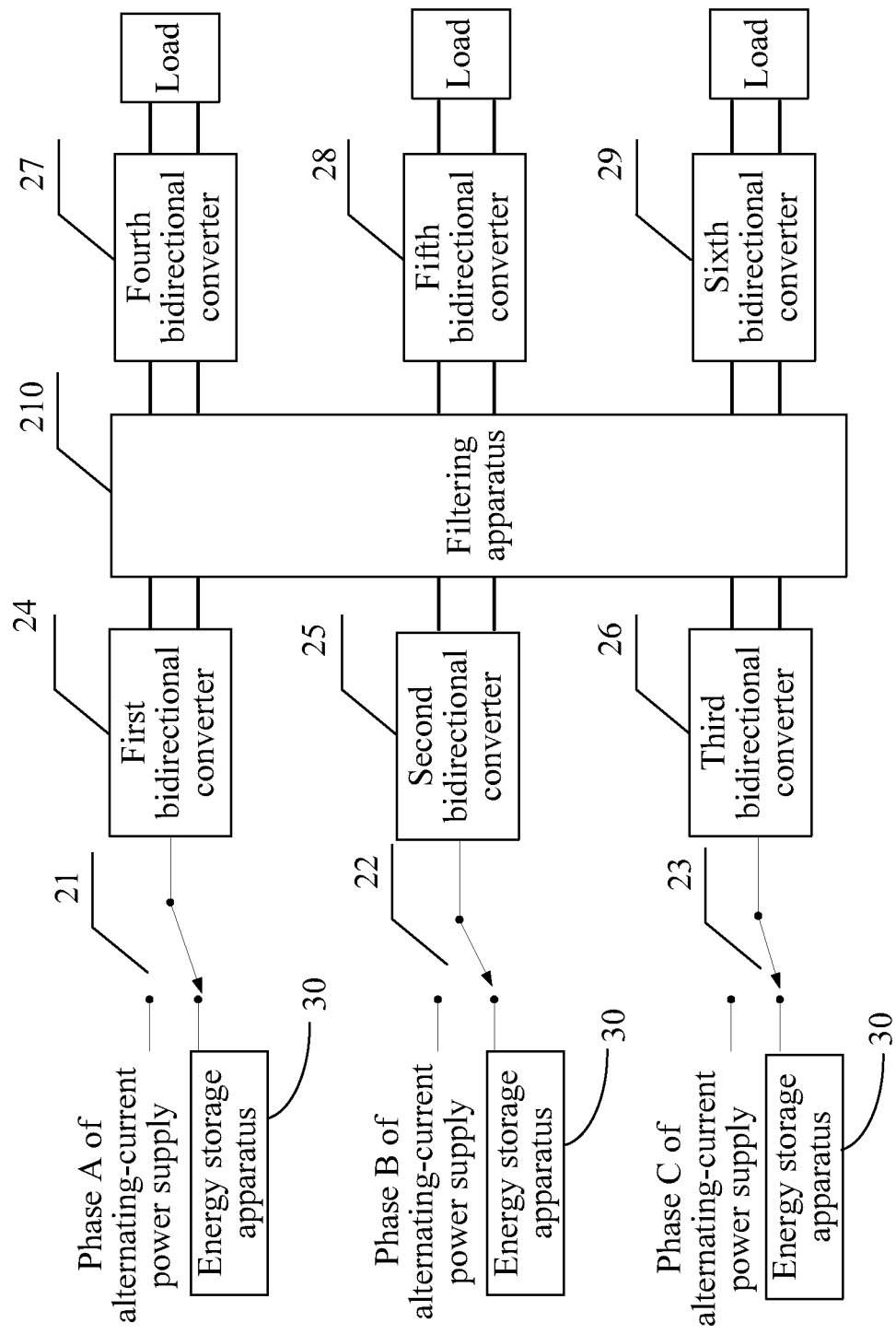
FIG. 2 is a schematic diagram of a circuit principle of a three-phase UPS circuit according to the present invention.

Referring to FIG. 2, FIG. 2 shows a schematic structural diagram of a three-phase UPS circuit according to an embodiment of this application.

The three-phase UPS circuit includes three single-phase UPS circuits shown in FIG. 1, and includes a first bidirectional selector switch 21, a second bidirectional selector switch 22, a third bidirectional selector switch 23, a first bidirectional converter 24, a second bidirectional converter 25, a third bidirectional converter 26, a fourth bidirectional converter 27, a fifth bidirectional converter 28, a sixth bidirectional converter 29, an energy storage apparatus 30, and a filtering apparatus 210.

The first bidirectional selector switch 21, the second bidirectional selector switch 22, and the third bidirectional selector switch 23 may be implemented by using a single-pole double-throw relay, two independent relays, or two independent bidirectional thyristors; a single-pole double-throw is used as a bidirectional selector switch in FIG. 2, and an on-off state of the bidirectional selector switch may be controlled by using a control signal output by a controller under the principle of a structure of a single pole double throw relay.

A first fixed end of the first bidirectional selector switch 21 is connected to a phase A of an alternating-current power supply (a power grid), a second fixed end is connected to the energy storage apparatus 30, and a movable end is connected to an alternating-current end of the first bidirectional converter 24, where a first fixed end of the second bidirectional selector switch 22 is connected to a phase B of the alternating-current power supply, a second fixed end is connected to the energy storage apparatus 30, and a movable end is connected to an alternating-current end of the second bidirectional converter 25; and a first fixed end of the third bidirectional selector switch 23 is connected to a phase C of the alternating-current power supply, a second fixed end is connected to the energy storage apparatus 30, and a movable end is connected to an alternating-current end of the third bidirectional converter 26.

Direct-current ends of the first bidirectional converter 24, the second bidirectional converter 25, the third bidirectional converter 26, the fourth bidirectional converter 27, the fifth bidirectional converter 28, and the sixth bidirectional converter 29 are all connected to two ends of the filtering apparatus 210 in parallel.

Alternating-current ends of the fourth bidirectional converter 27, the fifth bidirectional converter 28, and the sixth bidirectional converter 29 are all connected to a load 211.

The first bidirectional converter 24, the second bidirectional converter 25, and the third bidirectional converter 26 in this embodiment are first-type bidirectional converters, and such type of bidirectional converters have four operating statuses, which are rectifying, inverting, boosting, and bucking. The fourth bidirectional converter 27, the fifth bidirectional converter 28, and the sixth bidirectional converter 29 are second-type bidirectional converters, which have two operating statuses, which are inverting and rectifying.

The first-type bidirectional converter and the second-type bidirectional converter may both be implemented by using a half-bridge fully-controlled converter, a T-type three-level converter, and an I-type three-level converter; moreover, a control manner of inverting and rectifying functions of the first-type bidirectional converter is the same as a control manner of inverting and rectifying functions of the second-type bidirectional converter.

As for boosting and bucking functions of the first-type bidirectional converter, the controller outputs a pulse control signal with different duty cycles to control a turn-on time of a switching tube in the bidirectional converter, and the boosting and bucking functions of the bidirectional converter are finally implemented.

In the three-phase UPS circuit provided in this embodiment, the three-phase circuit uses a bidirectional selector switch to alternatively connect the alternating-current power supply and the energy storage apparatus to the UPS circuit, and can independently control close and turn-off states of three bidirectional selector switches on the three-phase circuit, that is, the three-phase circuit can independently control operation modes of three circuits, which are a phase-A circuit, a phase-B circuit, and a phase-C circuit, that is, the operation modes of the three circuits, which are the phase-A circuit, the phase-B circuit, and the phase-C circuit, can be combined arbitrarily. The operation modes include a mode in which an alternating-current power supply supplies power, a mode in which an energy storage apparatus supplies power, and a mode in which a part of phases of an alternating-current power supply supply power and a remaining phase charges an energy storage apparatus.

This embodiment mainly introduces a part before a BUS bus in detail, and an operating process of a down-level second-type bidirectional converter is exactly the same as the operating principle of the second bidirectional converter in the embodiment corresponding to FIG. 1, which is not introduced herein in detail again.

Combinations of different operation modes of a three-phase UPS circuit are introduced in detail in the following with reference to accompanying drawings.

1. In a Mode in which an Alternating-Current Power Supply Supplies Power.

Figure 3:
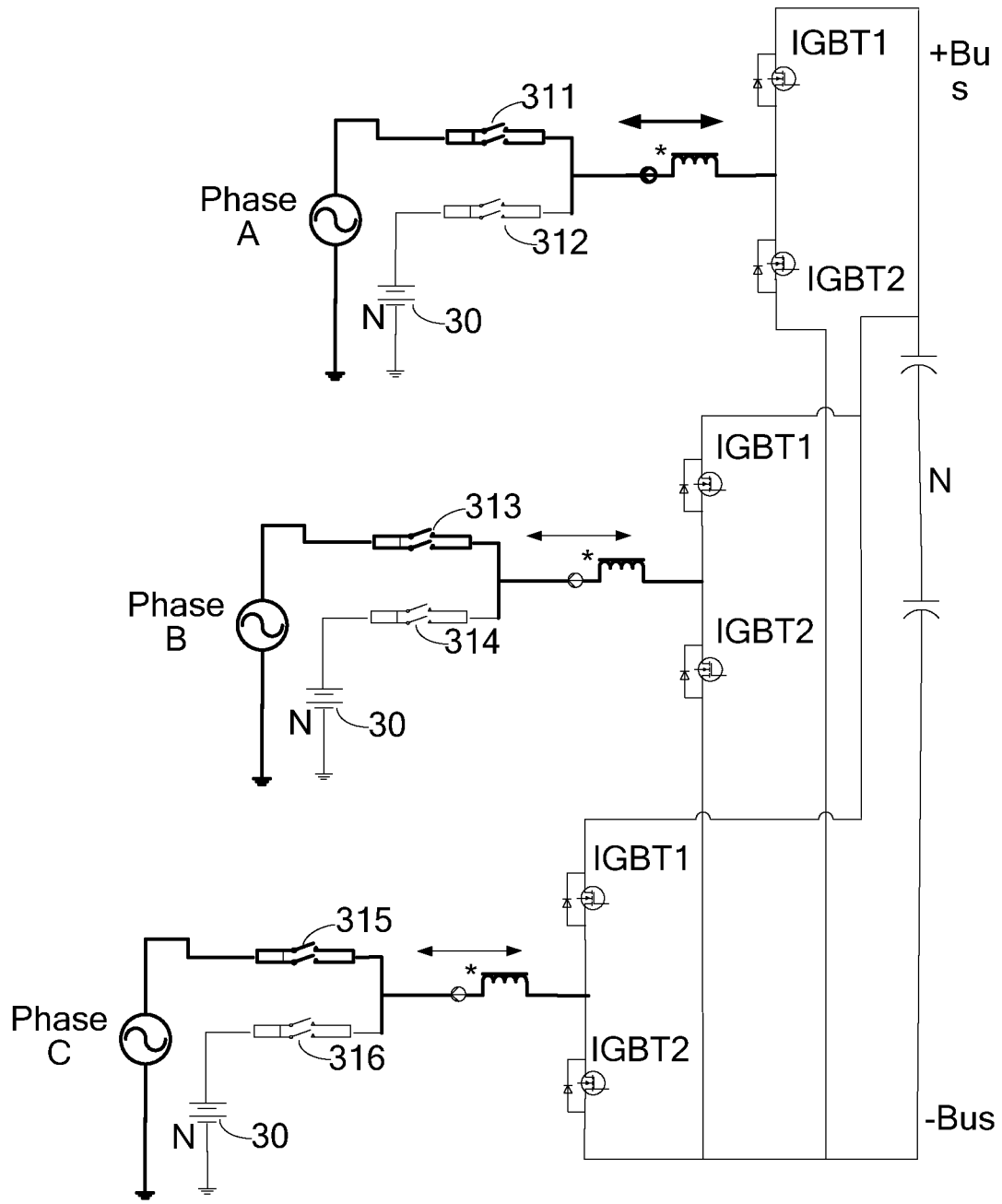
FIG. 3 is a schematic diagram of an operating principle of a circuit shown in FIG. 2 being in an alternating-current power supply mode.

Referring to FIG. 3, FIG. 3 shows a diagram of an operating principle of a three-phase UPS circuit which is shown in FIG. 2 and operates in the mode in which an alternating-current power supply supplies power.

As shown in FIG. 3, a bidirectional selector switch in a circuit in each phase is implemented by using two independent single-throw relays. In a phase-A circuit, a bidirectional selector switch is connected to a phase-A alternating-current power supply by using a first relay 311 and connected to an energy storage apparatus 30 by using a second relay 312; in a phase-B circuit, a bidirectional selector switch is connected to a phase-B alternating-current power supply by using a third relay 313 and connected to the energy storage apparatus 30 by using a fourth relay 314; in a phase-C circuit, a bidirectional selector switch is connected to a phase-C alternating-current power supply by using a fifth relay 315 and connected to the energy storage apparatus 30 by using a sixth relay 316.

It should be noted that, a relay in a three-phase circuit is connected to a first-type bidirectional converter by using an inductor L, and the inductor L is configured to perform filtering and energy storage; the following accompanying drawings also include the inductor L, which is not introduced in detail again below.

The first-type bidirectional converters in the phase-A circuit, the phase-B circuit, and the phase-C circuit are all implemented by using a half-bridge fully-controlled converter, that is, implemented by using two switching tubes connected in series; specifically, a switching tube may be a bidirectional semiconductor device, such as an insulated gate bipolar transistor (IGBT), a metal-oxide-semiconductor field-effect transistor (MOSFET), and the like.

When a load is large, and the alternating-current power supply can normally supply power, the phase A, the phase B, and the phase C of the alternating-current power supply are all in the mode in which an alternating-current power supply supplies power, the controller controls closing of normally opened contacts of the first relay 311, the third relay 313, and the fifth relay 315, that is, the phase-A circuit, the phase-B circuit, and the phase-C circuit are all connected to the alternating-current power supply, and a specific operating process is as follows: an alternating current output by the phase A is input to a first bidirectional converter after passing through a first relay; after the alternating current is rectified by the first bidirectional converter, a +bus voltage and a −bus voltage are obtained at two ends of a filtering apparatus 210; and the +bus voltage and the −bus voltage are provided for the load after being inverted by a down-level bidirectional converter; an alternating current output by the phase B is input to a second bidirectional converter after passing through a third relay; after the alternating current is rectified by the second bidirectional converter, the +bus voltage and the −bus voltage are obtained at the two ends of the filtering apparatus 210; and the +bus voltage and the −bus voltage are provided for the load after being inverted by the down-level bidirectional converter; and an alternating current output by the phase C is input to a third bidirectional converter after passing through a fifth relay; after the alternating current is rectified by the third bidirectional converter, the +bus voltage and the −bus voltage are obtained at the two ends of the filtering apparatus 210; and the bus voltage and the −bus voltage are provided for the load after being inverted by the down-level bidirectional converter.

If a load connected to a UPS circuit has an energy backfeed characteristic, after a down-level load is rectified by a second-type bidirectional converter, the down-level load is transmitted to two ends of a filtering apparatus; after being inverted by the first-type bidirectional converter, energy is returned to the alternating-current power supply (a power grid); and this process is an alternating current backflow process.

2. A Three-Phase UPS Circuit Operates in a Mode in which a Part of Phases Supply Power and a Remaining Phase Performs Charging.

Figure 4A:
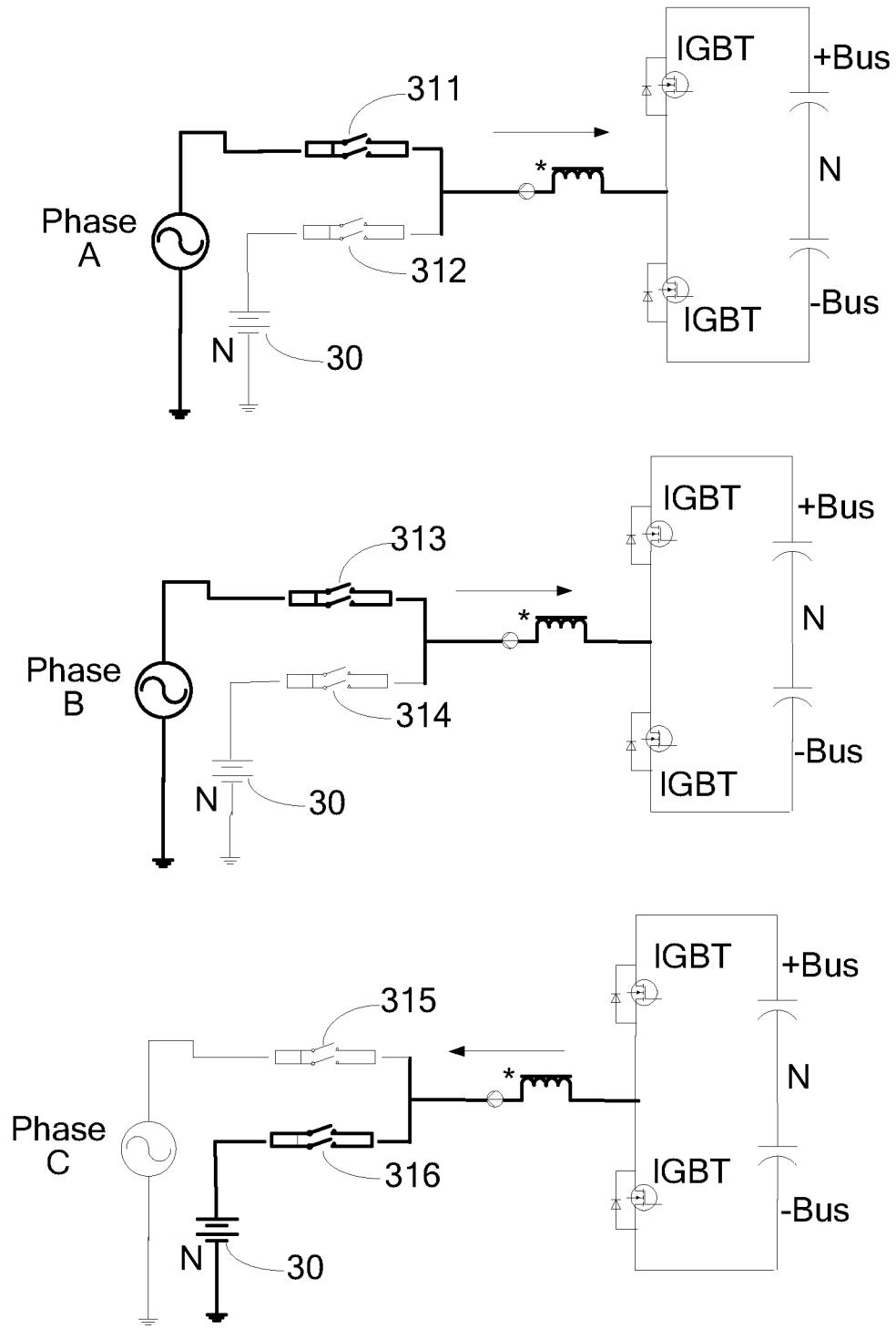
FIG. 4A is a schematic diagram of a operating principle of a circuit shown in FIG. 2 being in a mode in which a part of phases supply power and a remaining phase performs charging.
Figure 4B:
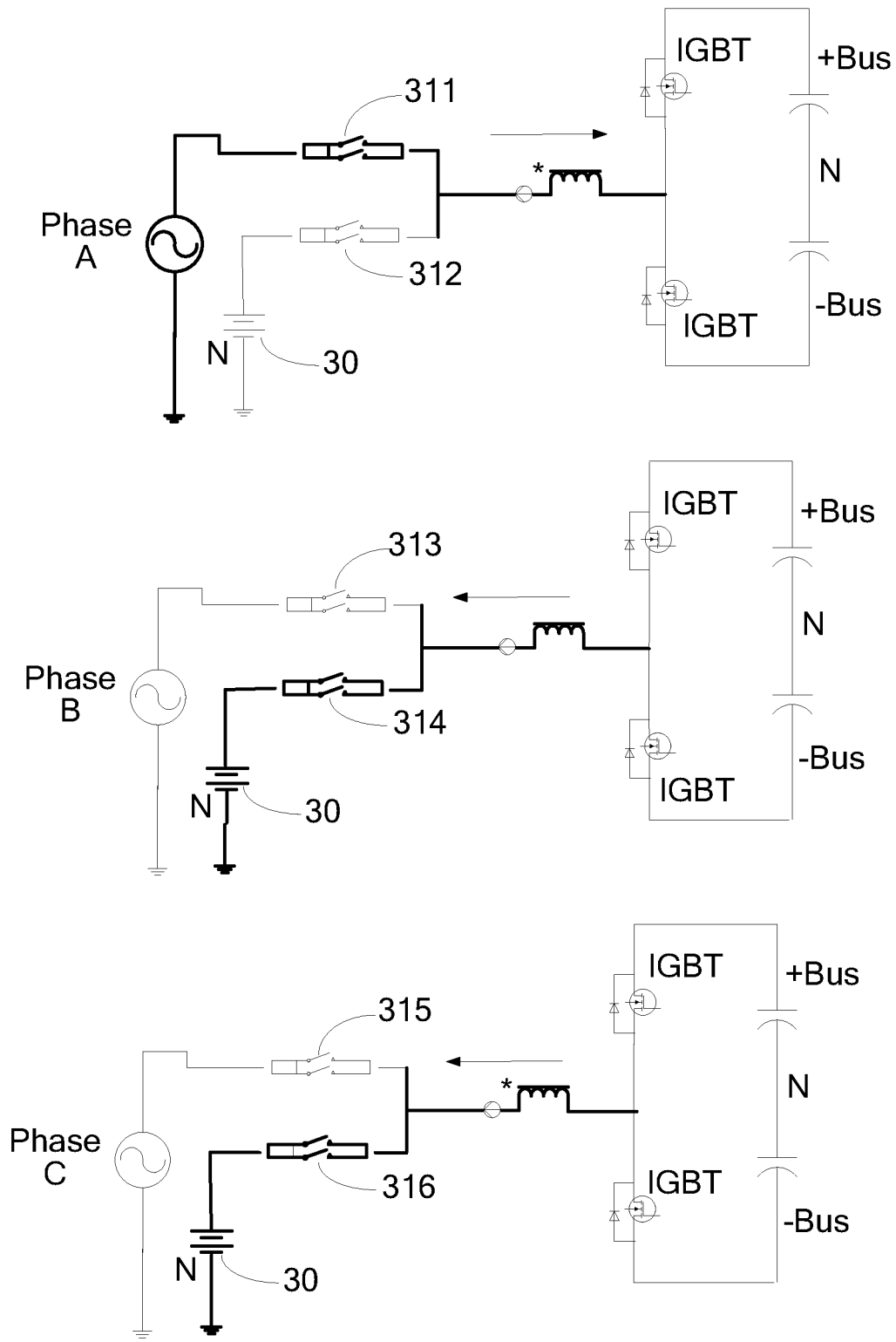
FIG. 4B is a schematic diagram of another operating principle of a circuit shown in FIG. 2 being in a mode in which a part of phases supply power and a remaining phase performs charging.
Figure 5:
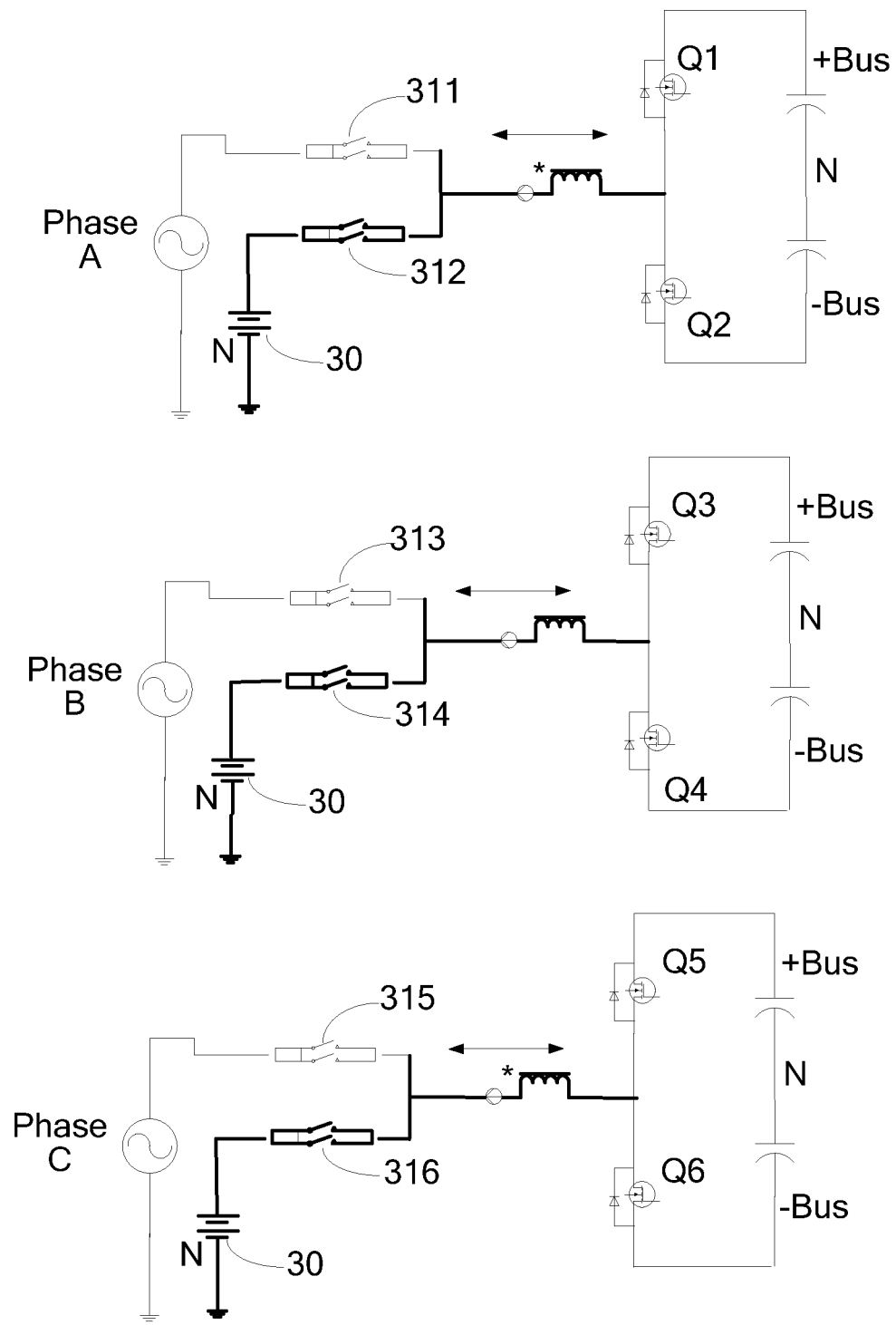
FIG. 5 is a schematic diagram of an operating principle of a circuit shown in FIG. 2 being in a mode in which an energy storage apparatus is charged or discharges.

It should be noted that, to indicate a three-phase circuit in a figure more clearly, filtering apparatuses connected to a phase A, a phase B, and a phase C shown in FIG. 4A to FIG. 5 (capacitors between a +BUS and a −BUS in the figures) are a same filtering apparatus.

Referring to FIG. 4A and FIG. 4B, FIG. 4A and FIG. 4B show a diagram of an operating principle corresponding to a mode in which a three-phase UPS circuit shown in FIG. 2 operates and in which a part of phases of an alternating-current power supply supply power and a remaining phase performs charging, and a circuit structure of the three-phase UPS circuit in the figure is the same as a circuit structure shown in FIG. 3, which is not described herein again.

When a load is small and a two-phase or single-phase circuit of the alternating-current power supply can meet an energy requirement of the load, energy of a remaining phase may be transferred to a channel of an energy storage apparatus, so as to charge the energy storage apparatus.

(1) A two-phase alternating-current power supply in a three-phase circuit of the alternating-current power supply supplies power to the load, and a first-type bidirectional converter in a remaining single-phase alternating-current circuit charges the energy storage apparatus.

As shown in FIG. 4A, a phase-A alternating-current power supply and a phase-B alternating-current power supply in the three-phase circuit supply power to the load, and a first-type bidirectional converter in a phase-C circuit charges the energy storage apparatus; in this case, a controller controls closing of normally opened contacts of a first relay 311, a third relay 313, and a sixth relay 316, that is, the phase-A alternating-current power supply and the phase-B alternating-current power supply are switched on, the phase-C circuit is connected to the energy storage apparatus, and an operating process of a down-level circuit of a bidirectional selector switch is as follows: after an alternating current output by the phase A passes through a first relay and is provided for a first bidirectional converter for rectification, a +bus voltage and a −bus voltage are obtained on a bus +BUS and a bus −BUS connected to two ends of the filtering apparatus, and the alternating current is then provided for the load after being inverted by a down-level bidirectional converter; after an alternating current output by the phase B passes through a third relay and is provided for a second bidirectional converter for rectification, the +bus voltage and the −bus voltage are obtained on the bus +BUS and the bus −BUS, and the alternating current is then provided for the load after being inverted by a down-level fifth bidirectional converter; and a sixth bidirectional converter in the phase-C circuit obtains electric energy from the buses at the two ends of the filtering apparatus, and supplies power to the load after the current is inverted; meanwhile, an upper-level third bidirectional converter obtains electric energy from the buses at the two ends of the filtering apparatus, and charges the energy storage apparatus after bucking, that is, an upper-level third bidirectional converter in the phase-C circuit charges the energy storage apparatus, and a down-level sixth bidirectional converter supplies power to the load.

In this operation mode, the phase-A alternating current and the phase-B alternating current supply power to the bus BUS, and the phase-A circuit, the phase-B circuit, and the phase-C simultaneously supply power to the load; at the same time, an upper-level circuit of the phase C charges the energy storage apparatus; therefore, power of the load in this operation mode cannot be too great.

It should be noted that, in this embodiment, alternating currents in any two phases in the three-phase circuit may supply power to the load, and a remaining phase may charge the energy storage apparatus; what is shown in FIG. 4A is only an example, which cannot constitute any limitation to this application.

(2) One phase in the three-phase alternating-current circuit supplies power to the load, and remaining two phases charge the energy storage apparatus.

As shown in FIG. 4B, the phase-A circuit in the three-phase circuit supplies power to the load, and the phase-B circuit and the phase-C circuit charge the energy storage apparatus; in this case, the controller controls the closing of the normally opened contacts of the first relay 311, the fourth relay 314, and the sixth relay 316, that is, the phase-A circuit is connected to the phase-A alternating-current power supply, the phase-B circuit and the phase-C circuit are connected to the energy storage apparatus, and an operating process of a down-level circuit of the bidirectional selector switch is as follows: after the alternating current output by the phase A is transmitted to the first bidirectional converter for rectification by passing through the first relay 311, the +bus voltage and the −bus voltage are obtained on the buses BUS at the two ends of the filtering apparatus; and then the +bus voltage and the −bus voltage are provided for the load after being inverted by a fourth bidirectional converter; a fifth bidirectional converter in the phase-B circuit obtains power from the bus BUS, and supplies the power to the load after the power is inverted; at the same time, an upper-level second bidirectional converter obtains power from the bus BUS to charge the energy storage apparatus; and similarly, the sixth bidirectional converter in the phase-C circuit obtains power from the bus BUS and supplies the power to the load after the power is inverted by the sixth bidirectional converter; at the same time, an upper-level third bidirectional converter obtains power from the bus BUS to charge the energy storage apparatus.

In this operation mode, the phase-A alternating current supplies power to the bus BUS, and the phase-A circuit, the phase-B circuit, and the phase-C circuit simultaneously supply power to the load; at the same time, the phase-B circuit and the phase-C circuit charge the energy storage apparatus; therefore, power of the load in this operation mode cannot be too great.

It should be noted that, in this embodiment, an alternating current in any phase of the three-phase circuit may supply power to the load, and the remaining two phases may charge the energy storage apparatus; what is shown in FIG. 4B is only an example, which cannot constitute any limitation to this application.

In this operation mode, a smaller the load, the greater charging power of the energy storage apparatus, and maximum charging power can match with power of a power supply.

Circuits in three phases of the three-phase UPS circuit in this embodiment may be in different operating statuses; when energy required by the load is not large, a part of phases of circuits in three phases may operate in a state of alternating-current power supply, and a remaining phase operates in a state of charging the energy storage apparatus, so as to avoid a waste of electric energy of an input power grid, and improve an utilization rate of the input power grid to a largest extent.

3. Operation Mode in which an Energy Storage Apparatus Discharges.

Referring to FIG. 5, FIG. 5 shows a diagram of an operating principle for a three-phase UPS circuit which is shown in FIG. 2 and operates in an operation mode in which an energy storage apparatus is charged or discharges.

A: In the mode in which the energy storage apparatus discharges, when a three-phase alternating-current power supply abnormally supplies power, the energy storage apparatus discharges and supplies power to a load, so as to ensure normal power supply of the load, which may be specifically classified into the following several situations.

(1) When a phase-A alternating current, a phase-B alternating current, and a phase-C alternating current are all abnormal, a phase-A circuit, a phase-B circuit, and a phase-C circuit all operate in the mode in which the energy storage apparatus discharges; in this case, a controller controls closing of normally opened contacts of a second relay, a fourth relay, and a sixth relay, the energy storage apparatus is connected to all of the phase-A circuit, the phase-B circuit, and the phase-C circuit, and a specific operating process is as follows.

After electric energy output by the energy storage apparatus is separately provided for a first bidirectional converter, a second bidirectional converter, and a third bidirectional converter for rectification by passing through a second-type bidirectional selector switch (the phase A, the phase B, and the phase C respectively pass through the second relay, the fourth relay, and the sixth relay), a +bus voltage and a −bus voltage are generated at two ends of a filtering apparatus, and after being inverted by the a bidirectional converter, a fifth bidirectional converter, and a sixth bidirectional converter, the +bus voltage and the −bus voltage are provided for the load.

(2) When a part of phases of an alternating-current power supply abnormally supplies power, a circuit in a phase which abnormally supplies power operates in the mode in which the energy storage apparatus discharges, and a circuit in a phase which normally supplies power operates in an alternating-current power supply mode; it is assumed that only the phase-A alternating current abnormally supplies power; in this case, the controller controls closing of normally opened contact of the second relay in a phase-A alternating-current circuit, so that an energy storage apparatus 30 supplies power to the load, and a power supply process is similar to a power supply process of the energy storage apparatus when the foregoing alternating currents in the three phases are all in an abnormal power supply state, which is not described herein again.

Similarly, when only the phase-B alternating current or the phase-C alternating current abnormally supplies power, or the alternating current in any one of the phase A, the phase B, and the phase C abnormally supplies power, a discharging process of the energy storage apparatus is similar to a discharging process of the energy storage apparatus when the phase-A alternating current abnormally supplies power, which is not described one by one herein again.

B: Mode in which the energy storage apparatus is charged.

(1) When circuits in the three phases of the three-phase alternating-current power supply are all normal, a circuit in a part of the phases operates in a state of alternating-current power supply, a remaining phase may charge the energy storage apparatus, and a specific operating process is the same as the foregoing operating process that a three-phase UPS circuit operates in a mode in which a part of phases supply power and a remaining phase charges, which is not described herein again.

(2) When three phases of the three-phase alternating-current power supply are all in a state of abnormal alternating-current power supply, first-type bidirectional converters of the three phases all act as chargers; in this case, a second-type bidirectional converter in the three-phase circuit obtains power from a load; after the power is rectified by the second-type bidirectional converter, a +bus voltage and a −bus voltage are generated on buses +BUS and −BUS, and an energy storage apparatus is charged after the power is bucked by an upper-level first-type bidirectional converter. In this case, the phase-A circuit, the phase-B circuit, and the phase-C circuit are all in a charging state, and charging power reaches a maximum value.

Any bidirectional selector switch in any one of the foregoing embodiments may be implemented by using a single-pole double-throw relay, two independent single-throw relays, or two independent bidirectional thyristors.

For a specific schematic diagram in which a bidirectional selector switch is implemented by using two independent single-throw relays, refer to FIG. 3 to FIG. 5. Referring to FIG. 3, descriptions are made by using a first relay and a second relay that are connected to the phase-A circuit as an example, a connection relationship between relays in other phases is the same as a connection relationship between relays of the phase-A circuit, which is not described herein again.

A first normally opened contact of a first relay 311 is connected to the phase-A alternating-current power supply, a second normally opened contact is connected to an alternating-current end of the first bidirectional converter, a coil is connected to the controller, the controller controls closing and opening of a normally opened contact of the first relay by controlling whether the coil obtains power or not, thereby controlling a type of a power supply connected to the phase-A circuit, the alternating-current power supply, or the energy storage apparatus.

A first normally opened contact of a second relay 312 is connected to the energy storage apparatus, a second normally opened contact is connected to an alternating-current end of a first bidirectional converter, and a coil is connected to the controller.

Figure 6:
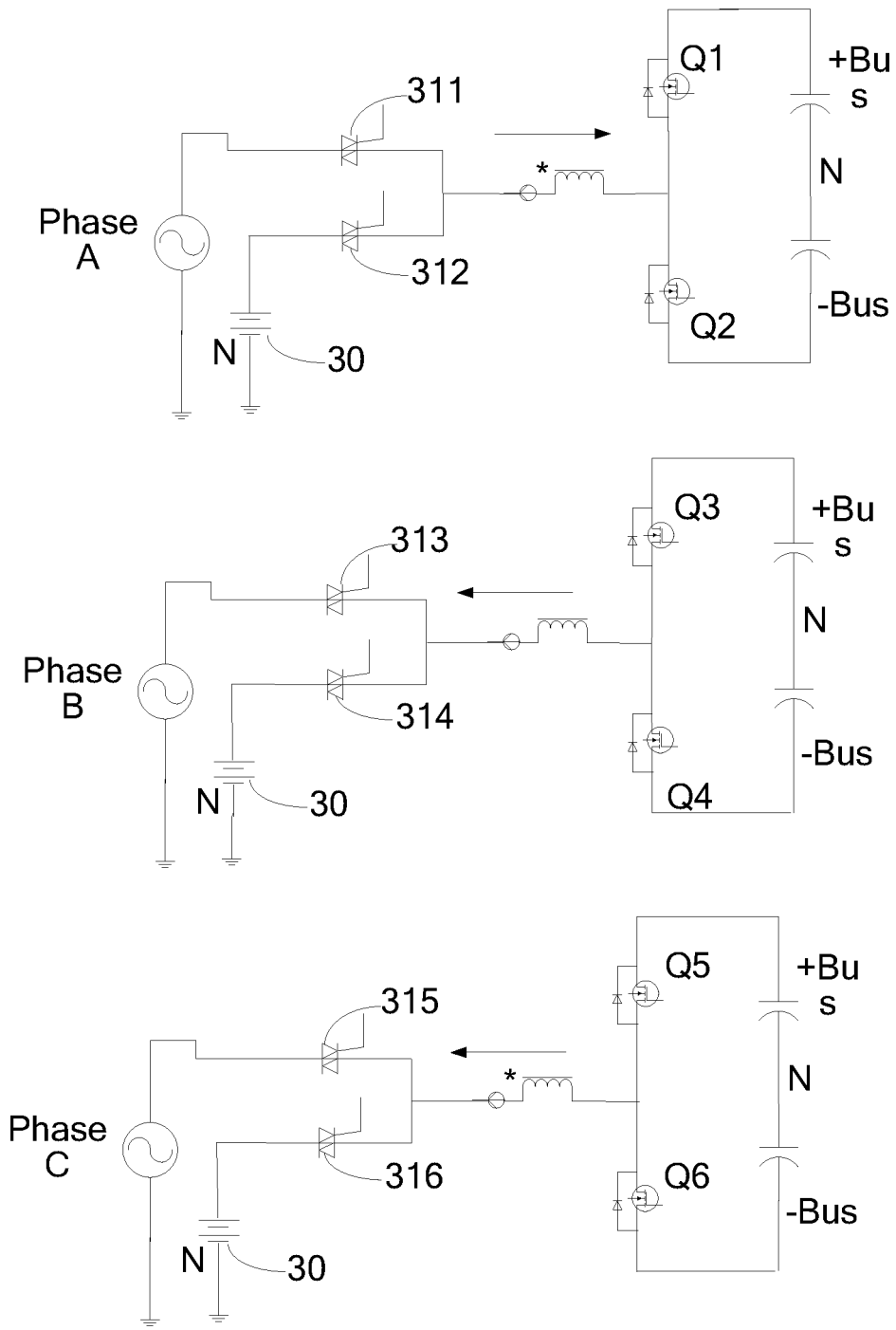
FIG. 6 is a partial schematic structural diagram of a three-phase UPS circuit according to an embodiment of the present invention.

As shown in FIG. 6, FIG. 6 shows a partial schematic structural diagram of another three-phase UPS circuit according to an embodiment of this application. Different from a circuit shown in FIG. 3, a bidirectional selector switch is implemented by a bidirectional thyristor, and a phase-A circuit, a phase-B circuit, and a phase-C circuit all include two bidirectional thyristors, where one bidirectional thyristor is connected to an alternating-current power supply, and the other bidirectional thyristor is connected to an energy storage apparatus, so as to implement that the alternating-current power supply and the energy storage apparatus are alternatively connected to the UPS circuit. Descriptions are made by using the phase-A circuit as an example in the following, and the phase-B circuit and the phase-C circuits are the same as the phase-A circuit, which are not described herein again.

A first end of a first bidirectional thyristor SCR1 is connected to a phase-A alternating-current power supply, a second end is connected to an alternating-current end of a first bidirectional converter, a control end is connected to a controller, and turn-on or turn-off of the first bidirectional thyristor is controlled by a control signal output by the controller.

A first end of a second bidirectional thyristor SCR2 is connected to a phase-B alternating-current power supply, a second end is connected to an alternating-current end of a second bidirectional converter, and a control end is connected to the controller.

As shown in FIG. 6, the bidirectional converter in this embodiment is implemented by using a half-bridge fully-controlled converter.

Descriptions are made by using the phase-A circuit as an example, structures of the phase-B circuit and the phase-C circuits are the same as the structure of the phase-A circuit. The half-bridge fully-controlled converter includes a first switching tube Q1 and a second switching tube Q2. In this embodiment, the Q1 and the Q2 are specifically N-channel MOSFETs; the Q1 and the Q2 are connected in series and then are connected to two ends of a filtering apparatus in parallel. A source of the Q1 is connected to a drain of the Q2; as a direct-current end of the bidirectional converter, a drain of the Q1 is connected to an anode of the filtering apparatus; as a direct-current end of the bidirectional converter, a source of the Q2 is connected to a cathode of the filtering apparatus; as an alternating-current end of the bidirectional converter, a common end of the Q1 and the Q2 is connected to the bidirectional selector switch.

Gates of the Q1 and the Q2 are connected to different signal output ends of the controller, and the controller outputs two control signals to separately control turn-on and turn-off states of the Q1 and the Q2. The Q1 and the Q2 are controlled to turn on alternately, so as to implement rectifying and inverting functions, and boosting or bucking is implemented by controlling a turn-on time of a switching tube in the bidirectional converter by using a pulse control signal which is output by the controller and has different duty cycles.

The bidirectional converter provided in this embodiment implemented by using a half-bridge fully-controlled converter, which is formed by few components, cost effective, and simple in control manner.

Figure 7:
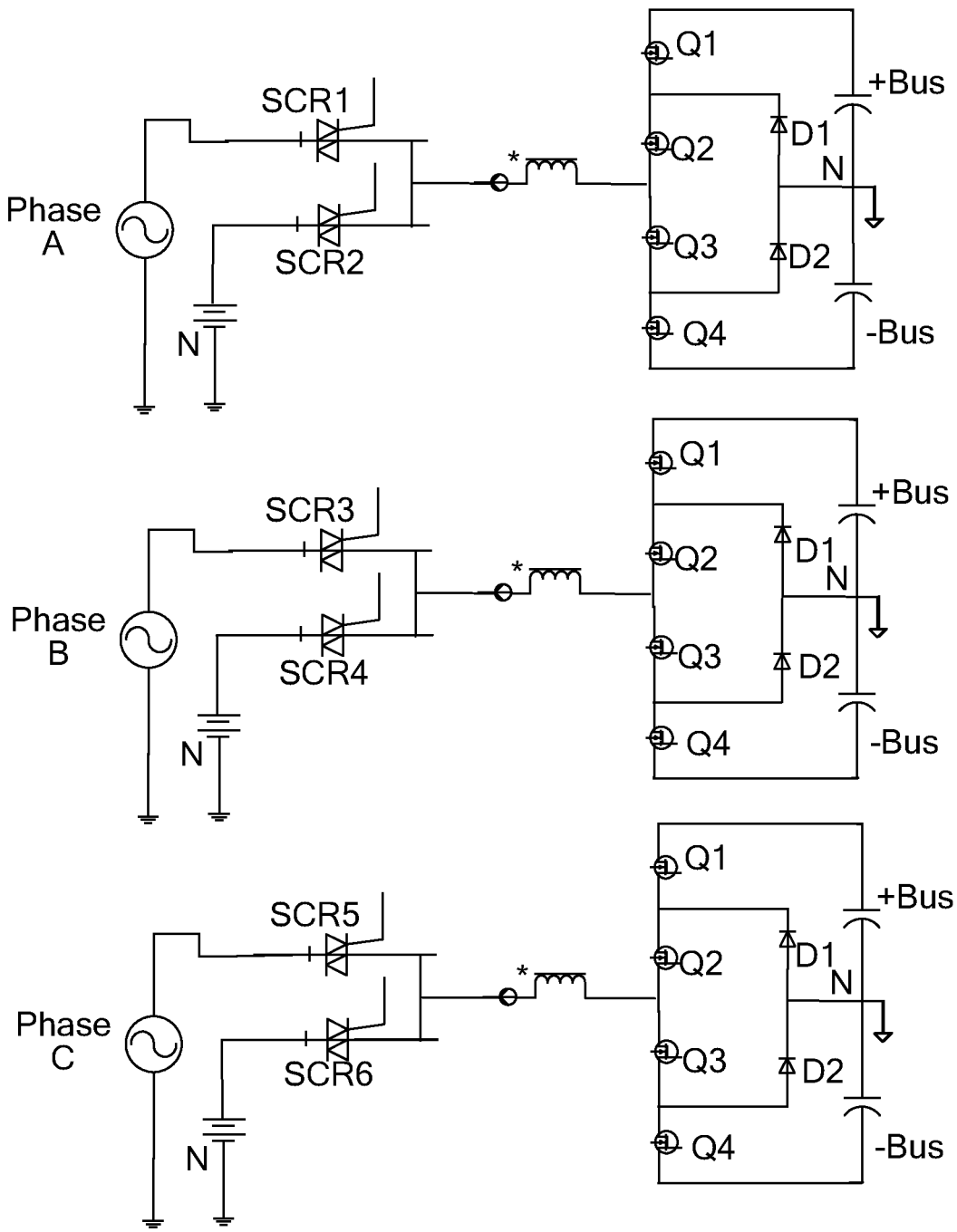
FIG. 7 is a partial schematic structural diagram of another three-phase UPS circuit according to an embodiment of the present invention.
Figure 8:
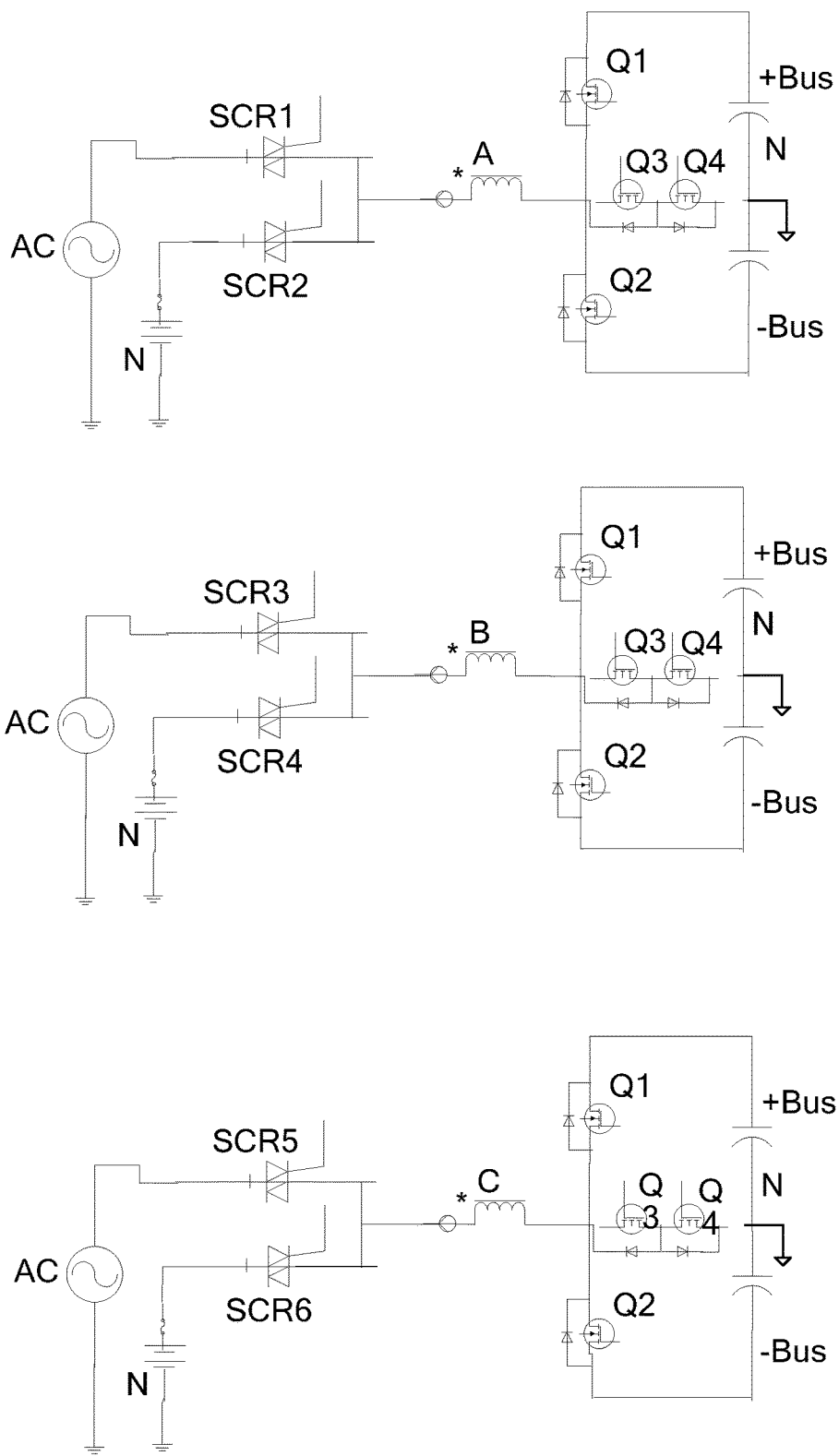
FIG. 8 is a partial schematic structural diagram of another three-phase UPS circuit according to an embodiment of the present invention.

As shown in FIG. 7, FIG. 7 shows a schematic structural diagram of another three-phase UPS circuit according to an embodiment of this application. A bidirectional converter of the three-phase UPS circuit is implemented by using an I-type three-level converter, where the I-type three-level converter includes a first switching tube Q1, a second switching tube Q2, a third switching tube Q3, a fourth switching tube Q4, a first diode D1, and a second diode D2. A Q1 to a Q4 shown in FIG. 8 are all N-channel MOSFET transistors and a diode is connected between a drain and a source of a MOSFET transistor; a cathode of the diode is connected to the drain, and an anode is connected to the source.

The Q1, the Q2, the Q3, and the Q4 are connected in series successively. A source of the Q1 is connected to a drain of the Q2, a source of the Q2 is connected to a drain of the Q3, and a source of the Q3 is connected to a drain of the Q4. As a direct-current end of the bidirectional converter, a drain of the Q1 is connected to an anode of a filtering apparatus; as a direct-current end of the bidirectional converter, a source of the Q4 is connected to a cathode of the filtering apparatus; as an alternating-current end of the bidirectional converter, a common end of the Q2 and the Q3 is connected to a bidirectional selector switch.

Gates of the Q1 to the Q4 are all connected to a controller, and control signals output by the controller separately control turn-on and turn-off states of the four tubes.

When a voltage of the alternating-current end of the bidirectional converter is in a positive semi-cycle, the Q1 and the Q3 are controlled to complementarily turn on (that is, when the Q1 turns on, the Q3 turns off; when the Q1 turns off, the Q3 turns on); at the same time, the Q2 is controlled to be always in a turn-on state, and the Q4 is controlled to be always in a cut-off state; when the voltage of the alternating-current end of the bidirectional converter is in a negative semi-cycle, the Q2 and the Q4 are controlled to complementarily turn on; meanwhile, the Q3 is controlled to be always in a turn-on state, and the Q1 is controlled to be always in a cut-off state, so as to finally implement rectifying and inverting; boosting and bucking functions are implemented by controlling a turn-on time of a switching tube in the bidirectional converter by using a pulse control signal which is output by the controller and has different duty cycles.

A cathode of the D1 is connected to a common end of the Q1 and the Q2, and an anode is connected to a neutral wire; a cathode of the D2 is connected to the neutral wire, and an anode is connected to a common end of the Q3 and the Q4.

The three-phase UPS circuit provided in this embodiment is implemented by using the I-type three-level converter, and the I-type three-level converter has an advantage of a small switching loss of the switching tube, and is applicable to a UPS circuit with high switching frequency.

As shown in FIG. 8, FIG. 8 shows a schematic structural diagram of another three-phase UPS circuit according to an embodiment of this application. A bidirectional converter of the three-phase UPS circuit is implemented by using a T-type three-level converter, where the T-type three-level converter includes a first switching tube Q1, a second switching tube Q2, a third switching tube Q3, and a fourth switching tube Q4. The Q1 to the Q4 are all N-channel MOSFET transistors and a diode is connected between a drain and a source of a MOSFET transistor; specifically, a cathode of the diode is connected to the drain, and an anode is connected to the source.

The Q1 and the Q2 are connected in series and then are connected to two ends of a filtering apparatus in parallel. A source of the Q1 is connected to a drain of the Q2; as a direct-current end of the bidirectional converter, a drain of the Q1 is connected to an anode of the filtering apparatus; as a direct-current end of the bidirectional converter, a source of the Q2 is connected to a cathode of the filtering apparatus; as an alternating-current end of the bidirectional converter, a common end of the Q1 and the Q2 is connected to a bidirectional selector switch; and a drain of the Q3 is connected to a source of the Q4, a source of the Q3 is connected to the common end of the Q1 and the Q2, and a drain of the Q4 is connected to a neutral wire.

Gates of the Q1 to the Q4 are all connected to a controller, and control signals output by the controller separately control turn-on and turn-off states of the four tubes. When a voltage of an alternating-current end of the bidirectional converter is in a positive semi-cycle, the Q1 and the Q4 are controlled to complementarily turn on; at the same time, the Q3 is controlled to be always in a turn-on state, and the Q2 is controlled to be always in a cut-off state; when the voltage of the alternating-current end of the bidirectional converter is in a negative semi-cycle, the Q2 and the Q3 are controlled to complementarily turn on, the Q4 is controlled to be always in a turn-on state, and the Q1 is controlled to be always in a cut-off state, so as to finally implement rectifying and inverting functions; boosting and bucking functions are implemented by controlling a turn-on time of a switching tube in the bidirectional converter by using a pulse control signal which is output by the controller and has different duty cycles.

The three-phase UPS circuit provided in this embodiment is implemented by using the T-type three-level converter, and a switching tube in the T-type three-level converter has a high voltage withstanding level and a low turn-on loss, so the T-type three-level converter is applicable to a UPS circuit of which switching frequency is not high.

It can be understood by a person skilled in the art that, the switching tubes in the foregoing embodiments may all be implemented by using a bidirectional semiconductor device in other forms, such as a P-channel MOSFET transistor, an IGBT, and the like.

Corresponding to the foregoing embodiments of a UPS circuit, this application further provides a method for controlling the UPS circuit, and the UPS circuit includes a bidirectional selector switch, a first-type bidirectional converter, a second-type bidirectional converter, an energy storage apparatus, a filtering apparatus, and a controller, where a first end of the bidirectional selector switch is connected to an alternating-current end of the first-type bidirectional converter, a second end is alternatively connected to an alternating-current power supply or the energy storage apparatus, and a control end is connected to a first end of the controller; a direct-current end of the first-type bidirectional converter is connected to the filtering apparatus, a control end is connected to a second output end set of the controller, and the first-type bidirectional converter has a function of rectifying, inverting, boosting or bucking; a direct-current end of the second-type bidirectional converter is connected to the filtering apparatus, an alternating-current end is connected to a load, a control end is connected to a third output end set of the controller, and the second-type bidirectional converter has a function of rectifying or inverting; the method includes, when the energy storage apparatus needs to be charged, controlling the bidirectional selector switch to connect to the energy storage apparatus, controlling the first-type bidirectional converter to be in a bucking state, and controlling the second-type bidirectional converter to be in a rectifying state; and when the energy storage apparatus discharges, controlling the bidirectional selector switch to connect to the energy storage apparatus, controlling the first-type bidirectional converter to be in a boosting state, and controlling the second-type bidirectional converter to be in an inverting state.

The foregoing descriptions are merely specific implementation manners of the present invention. It should be noted that a person of ordinary skill in the art may make certain improvements or polishing without departing from the principle of the present invention and the improvements or polishing shall fall within the protection scope of the present invention.

What is claimed is:

1. An uninterruptible power supply circuit, comprising:
   a bidirectional selector switch;
   a first-type bidirectional converter;
   a second-type bidirectional converter;
   an energy storage apparatus;
   a filtering apparatus; and
   a controller,
   wherein a first end of the bidirectional selector switch is connected to an alternating-current end of the first-type bidirectional converter, a second end is alternatively connected to an alternating-current power supply or the energy storage apparatus, and a control end is connected to a first output end of the controller,
   wherein a direct-current end of the first-type bidirectional converter is connected to the filtering apparatus, a control end is connected to a second output end set of the controller, and an operating status of the first-type bidirectional converter comprises rectifying, inverting, boosting or bucking,
   wherein a direct-current end of the second-type bidirectional converter is connected to the filtering apparatus, an alternating-current end is connected to a load, a control end is connected to a third output end set of the controller, and an operating status of the second-type bidirectional converter comprises inverting or rectifying, and
   wherein the controller is configured to:
      generate a control signal for controlling the bidirectional selector switch to connect to the energy storage apparatus when the energy storage apparatus needs to be charged,
      generate a control signal for controlling the first-type bidirectional converter to be in a bucking state when the energy storage apparatus needs to be charged,
      generate a control signal for controlling the second-type bidirectional converter to be in a rectifying state when the energy storage apparatus needs to be charged,
      output the control signal for controlling the bidirectional selector switch to connect to the energy storage apparatus when the energy storage apparatus discharges,
      generate a control signal for controlling the first-type bidirectional converter to be in a boosting state when the energy storage apparatus discharges, and
      generate a control signal for controlling the second-type bidirectional converter to be in an inverting state when the energy storage apparatus discharges.

2. The uninterruptible power supply circuit according to claim 1, wherein the bidirectional selector switch comprises a relay.

3. The uninterruptible power supply circuit according to claim 1, wherein the bidirectional selector switch comprises a bidirectional thyristor.

4. The uninterruptible power supply circuit according to claim 1, wherein the bidirectional selector switch is a single-pole double-throw relay, a first movable end of the single-pole double-throw relay is connected to the alternating-current power supply, a second movable end is connected to the energy storage apparatus, a fixed end is connected to the alternating-current end of the first-type bidirectional converter, and two ends of a coil are connected to the controller.

5. The uninterruptible power supply circuit according to claim 1, wherein the bidirectional selector switch comprises a first-type bidirectional selector switch and a second-type bidirectional selector switch, wherein a first end of the first-type bidirectional selector switch is connected to the alternating-current power supply, a second end is connected to the alternating-current end of the first-type bidirectional converter, and a control end is connected to the controller, and wherein a first end of the second-type bidirectional selector switch is connected to the energy storage apparatus, a second end is connected to the alternating-current end of the first-type bidirectional converter, and a control end is connected to the controller.

6. The uninterruptible power supply circuit according to claim 5, wherein both the first-type bidirectional selector switch and the second-type bidirectional selector switch are single-throw relays, a first normally opened contact of the single-throw relay is the first end of the bidirectional selector switch, a second normally opened contact of the single-throw relay is the second end of the bidirectional selector switch, and as control ends of the bidirectional selector switch, two ends of a coil of the single-throw relay are connected to the controller.

7. The uninterruptible power supply circuit according to claim 5, wherein when both the first-type bidirectional selector switch and the second-type bidirectional selector switch are bidirectional thyristors, a first end of the bidirectional thyristor is the first end of the bidirectional selector switch, a second end of the bidirectional thyristor is the second end of the bidirectional selector switch, and a gate of the bidirectional thyristor is the control end of the bidirectional selector switch and is connected to the controller.

8. The uninterruptible power supply circuit according to claim 5, wherein when the alternating-current power supply is a three-phase alternating-current power supply, the first-type bidirectional selector switch comprises a first bidirectional selector switch, a second bidirectional selector switch, and a third bidirectional selector switch, wherein the second-type bidirectional selector switch comprises a fourth bidirectional selector switch, a fifth bidirectional selector switch, and a sixth bidirectional selector switch, wherein the first-type bidirectional converter comprises a first bidirectional converter, a second bidirectional converter, and a third bidirectional converter, wherein the second-type bidirectional converter comprises a fourth bidirectional converter, a fifth bidirectional converter, and a sixth bidirectional converter, wherein a first end of the first bidirectional selector switch is connected to an alternating-current end of the first bidirectional converter, a second end is connected to a phase A of the three-phase alternating-current power supply, and a control end is connected to the controller, wherein a first end of the second bidirectional selector switch is connected to an alternating-current end of the second bidirectional converter, a second end is connected to a phase B of the three-phase alternating-current power supply, and a control end is connected to the controller, wherein a first end of the third bidirectional selector switch is connected to an alternating-current end of the third bidirectional converter, a second end is connected to a phase C of the three-phase alternating-current power supply, and a control end is connected to the controller, wherein a first end of the fourth bidirectional selector switch is connected to the alternating-current end of the first bidirectional converter, a second end is connected to the energy storage apparatus, and a control end is connected to the controller, wherein a first end of the fifth bidirectional selector switch is connected to the alternating-current end of the second bidirectional converter, a second end is connected to the energy storage apparatus, and a control end is connected to the controller, wherein a first end of the sixth bidirectional selector switch is connected to the alternating-current end of the third bidirectional converter, a second end is connected to the energy storage apparatus, and a control end is connected to the controller, wherein direct-current ends of the first bidirectional converter, the second bidirectional converter, and the third bidirectional converter are all connected to the filtering apparatus, wherein direct-current ends of the fourth bidirectional converter, the fifth bidirectional converter, and the sixth bidirectional converter are all connected to the filtering apparatus, and alternating-current ends are all connected to a load, wherein the controller is configured to separately control statuses of the bidirectional selector switch, the first-type bidirectional converter, and the second-type bidirectional converter that are connected to a phase-A alternating-current circuit, a phase-B alternating-current circuit, and a phase-C alternating-current circuit to separately control operation modes of the phase-A alternating-current circuit, the phase-B alternating-current circuit, and the phase-C alternating-current circuit, and wherein the operation modes comprise an alternating-current power supply mode, a mode in which the energy storage apparatus supplies power, and a mode in which the energy storage apparatus is charged.

9. The uninterruptible power supply circuit according to claim 1, wherein the first-type bidirectional converter is a half-bridge fully-controlled bidirectional converter, and the half-bridge fully-controlled bidirectional converter comprises a first switching tube and a second switching tube, wherein a common end obtained by connecting a first end of the first switching tube and a second end of the second switching tube is used as the alternating-current end of the first-type bidirectional converter, wherein both a second end of the first switching tube and a first end of the second switching tube are used as the direct-current end of the first-type bidirectional converter, and wherein control ends of the first switching tube and the second switching tube are used as the control end of the first-type bidirectional converter.

10. The uninterruptible power supply circuit according to claim 1, wherein the first-type bidirectional converter is an I-type three-level bidirectional converter, and the I-type three-level bidirectional converter comprises a first switching tube, a second switching tube, a third switching tube, a fourth switching tube, a first diode, and a second diode, wherein a first end of the first switching tube is connected to a second end of the second switching tube, a first end of the second switching tube is connected to a second end of the third switching tube, a first end of the third switching tube is connected to a second end of the fourth switching tube, a second end of the first switching tube and a first end of the fourth switching tube are used as the direct-current end of the first-type bidirectional converter, a common end of the second switching tube and the third switching tube is used as the alternating-current end of the first-type bidirectional converter, and control ends of the first switching tube, the second switching tube, the third switching tube, and the fourth switching tube are all connected to the controller, wherein an anode of the first diode is connected to a cathode of the second diode and is connected to a neutral wire end of the filtering apparatus, and a cathode of the first diode is connected to a common end of the first switching tube and the second switching tube, and wherein an anode of the second diode is connected to a common end of the third switching tube and the fourth switching tube.

11. The uninterruptible power supply circuit according to claim 1, wherein the first-type bidirectional converter is a T-type bidirectional converter, and the T-type bidirectional converter comprises a first switching tube, a second switching tube, a third switching tube, and a fourth switching tube, wherein a first end of the first switching tube is connected to a second end of the second switching tube, a common end of the first switching tube and the second switching tube is used as the alternating-current end of the first-type bidirectional converter, and a second end of the first switching tube and a first end of the second switching tube are used as the direct-current end of the first-type bidirectional converter, wherein a second end of the third switching tube is connected to a first end of the fourth switching tube, a first end of the third switching tube is connected to the common end of the first switching tube and the second switching tube, and a second end of the fourth switching tube is connected to a neutral wire end of the filtering apparatus, and wherein control ends of the first switching tube, the second switching tube, the third switching tube, and the fourth switching tube are all connected to the controller.

12. The uninterruptible power supply circuit according to claim 10, wherein the first switching tube, the second switching tube, the third switching tube, or the fourth switching tube is an insulated gate bipolar transistor or a metal-oxide-semiconductor field-effect transistor, wherein an emitter of the insulated gate bipolar transistor is a first end, a collector is a second end, and a gate is a control end, and wherein a source of the metal-oxide-semiconductor field-effect transistor is a first end, a drain is a second end, and a gate is a control end.

13. The uninterruptible power supply circuit according to claim 1, wherein the filtering apparatus comprises a first capacitor and a second capacitor, a cathode of the first capacitor is connected to an anode of the second capacitor and connected to an alternating-current neutral wire end, and as two ends of the filtering apparatus, an anode of the first capacitor and a cathode of the second capacitor are connected to the first-type bidirectional converter and the second-type bidirectional converter.

* * * * *